No. 744,731. PATENTED NOV. 24, 1903.
V. R. DUVALL.
GATE.
APPLICATION FILED MAY 18, 1903.
NO MODEL.
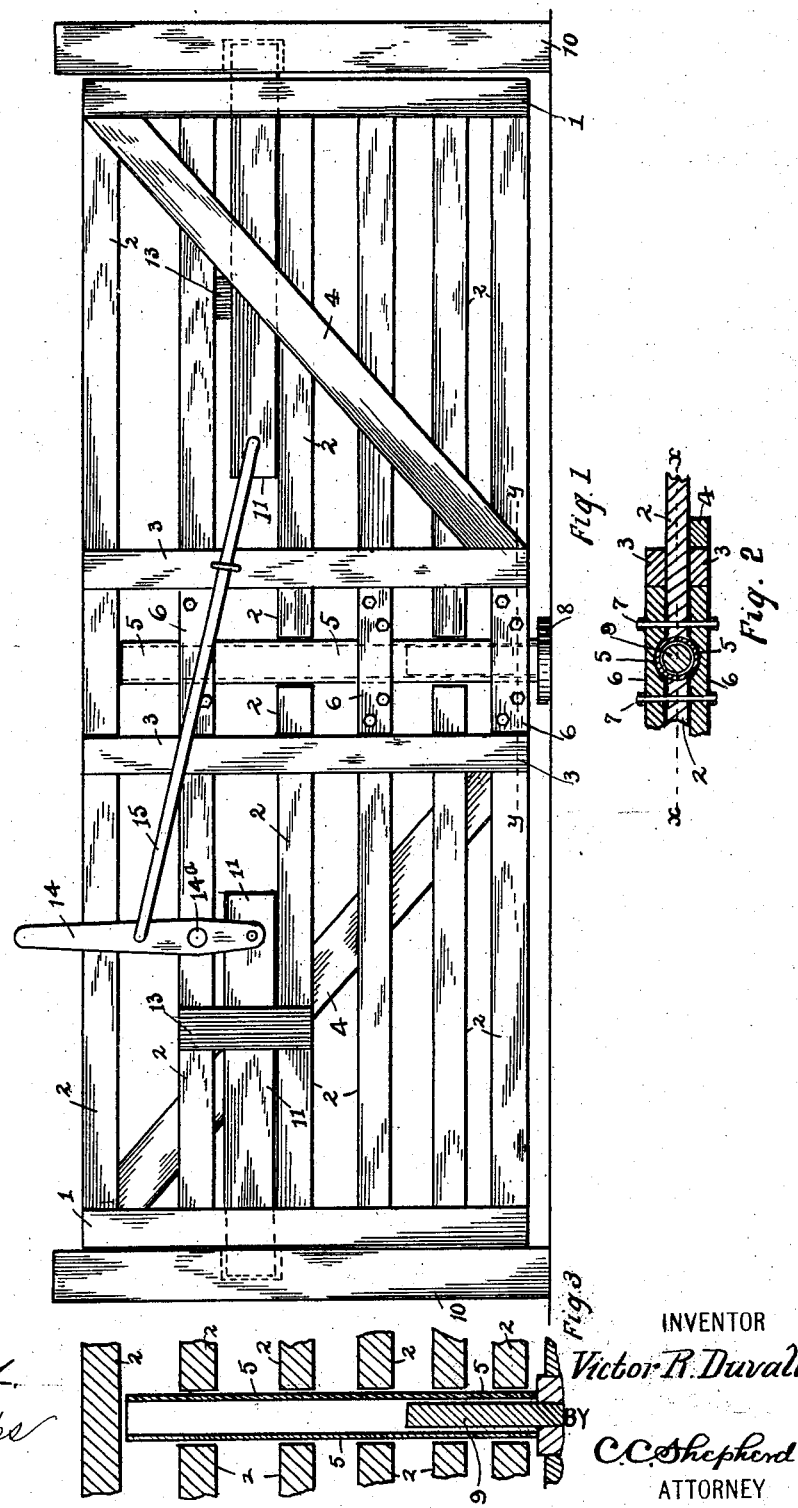
WITNESSES:
S. E. Ward
A. L. Phelps
INVENTOR
Victor R. Duvall
BY
C. C. Shepherd
ATTORNEY No. 744,731. Patented November 24, 1903.

UNITED STATES PATENT OFFICE.

VICTOR R. DUVALL, OF ASHVILLE, OHIO.

GATE.

SPECIFICATION forming part of Letters Patent No. 744,731, dated November 24, 1903.

Application filed May 18, 1903. Serial No. 157,715. (No model.)

*To all whom it may concern:*

Be it known that I, VICTOR R. DUVALL, a citizen of the United States, residing at Ashville, in the county of Pickaway and State of Ohio, have invented a certain new and useful Improvement in Gates, of which the following is a specification.

My invention relates to the improvement of gates of that class which are particularly adapted for use as farm-gates; and the objects of my invention are to provide an improved rotary gate construction so arranged and supported as to admit of the same being rotated in either direction and readily removed from the gateway for the purpose of increasing the width of the gateway-passage, to provide an improved connection of the gate structure and pivot-tube, and to produce other improvements the details of which will be more fully pointed out hereinafter. These objects I accomplish in the manner illustrated in the accompanying drawings, in which—

Figure 1 is a view in elevation of my improved gate, showing the same in a closed position. Fig. 2 is a transverse section on line *y y* of Fig. 1, and Fig. 3 is a central vertical section on line *x x* of Fig. 2.

Similar numerals refer to similar parts throughout the several views.

The framework of my improved gate consists, as shown, of the vertical end pieces 1, which are connected through the medium of the horizontal bars 2, these horizontal bars being further connected on opposite sides of the centers of their lengths by pairs of opposing vertical bars 3, between which and the end bars 1 are interposed diagonally-arranged brace-bars 4. Secured at the center of the length of the gate between the pairs of vertical bars 3 is a supporting or pivot tube 5, which is in the nature of a pipe-section, this pivot-tube extending from the under side of the upper bar 2 to a point below the lower horizontal bar of the gate and intersecting all of the horizontal bars below the upper one, said horizontal bars being separated centrally to permit of the passage between them of said tube. The tube 5 is held rigidly in connection with the gate-frame by securing on the outer sides of certain of the horizontal bars 2 clamping-bar sections 6, the inner surfaces of these clamping-sections having rounded recesses to embrace the laterally-projecting portions of the tube. As indicated in the drawings, the clamping-sections 6 are arranged to extend between the vertical bars 3 and are drawn tightly in connection with the bars 2 and the tube 5 by bolts or other suitable devices 7. At the center of the gateway I cause to be firmly seated in the ground a supporting-block 8, of stone or other suitable material, from which block rises a central pivot-pin 9, which is firmly embedded in or rigidly connected with said block. This pin, which is comparatively short, has its upwardly-extending portion loosely inserted within the lower portion of the tube 5, thus pivotally mounting the gate upon the central block 8 and permitting the gate to swing about said pin. At each side of the gateway I employ a suitable upright post 10, which, owing to the fact that neither of said posts is desired for support of the gate, may be ordinary fence-posts instead of the usual and comparatively large and heavy gate-posts.

Mounted to slide upon one of the horizontal bars 2, near each end of the gate, is a latch-bar 11, the latter adapted to have its forward end portion slide through an opening in the corresponding end frame-piece 1 and to enter a recess or latch-socket 12 of the post 10, as indicated in dotted lines in Fig. 1 of the drawings. In order to retain the latch-bars in their positions upon one of the horizontal bars of the gate, I connect two of said horizontal bars near each end of the gate with a short vertical bar 13, which in conjunction with the inclined brace-bars 4 operates to prevent the latch-bars from lateral movement. With the rear end portion of one of the latch-bars 11 I pivotally connect the lower end of an upwardly-extending operating-lever 14, this lever being pivoted, as indicated at 14ª, to one of the horizontal bars 2. With the central portion of the lever 14 I connect a rod 15, which, as shown in the drawings, has its remaining end connected with the inner or rear end of the remaining latch-bar, so that a forward movement of the upper end of the lever 14 results in an inward pull on both of said latch-bars and a consequent disengagement of the latter from the posts 10.

The width of the gateway and length of the gate is such as to leave between the central tube 5 and either one of the end posts 10 the usual gateway width, so that when the gate is swung at right angles to the position shown in the drawings an ordinary gateway is formed on opposite sides thereof. In case, however, it is desired to drive through the gateway with a machine of unusual width or with wagons having projecting loads, such as hay-wagons, &c., it will be understood that the latches may be moved out of engagement with the posts and the gate lifted off the pin 9 and set to one side, thus providing a double gateway or a gateway of unusual width. In this connection it will be understood that the pivot-pin 9 is not of such height as to interfere with the passage over the same of the ordinary farm machine or wagon.

From the construction and operation which I have described it will be understood that a farm-gate of simple and reliable construction is produced which will obviate the necessity of employing expensive gate-posts or hinges and which, owing to the fact that its central pivot-tube is rigidly connected therewith, may be readily removed to produce an enlarged gateway when desired.

I am aware that centrally-pivoted gates have been produced heretofore; but these differ from mine in points of construction set forth in the claims.

Having now fully described my invention, what I claim, and desire to secure by Letters Patent, is—

1. The combination with a rigid pivot-pin rising from the ground, of a gate embodying vertical end pieces, spaced intermediate vertical pieces, horizontal bars extending between the end and intermediate pieces and terminated short of the middle of the space between said intermediate pieces, an upright tubular member fitted between the inner ends of the horizontal bars with its lower open end rotatably embracing the pivot-pin and forming an intermediate pivot-bearing for the gate, clamp members snugly embracing the tubular member and the inner ends of corresponding horizontal bars, and fastenings piercing the clamp members and the bars.

2. A gate embodying vertical end pieces, spaced intermediate vertical pieces, horizontal bars extending between the end and intermediate pieces and terminated short of the middle of the space between said intermediate pieces, an upright tubular member fitted between the inner ends of the horizontal bars with its lower open end at the lower edge of the gate to form a bearing-socket, clamp members snugly embracing the tubular member and the inner ends of corresponding horizontal bars, and fastenings piercing the clamp members and the bars.

VICTOR R. DUVALL.

In presence of—
C. C. SHEPHERD,
P. S. KARSHNER.